United States Patent [19]

DiMarco et al.

[11] Patent Number: 5,073,043
[45] Date of Patent: Dec. 17, 1991

[54] CABLE JACKET RESTRAINT IN OPTICAL FIBER CONNECTORS

[76] Inventors: Brain A. DiMarco, 620 Asheton Way, Simpsonville, S.C. 29681; Akira Kawahara, 3-34-12, Higashi-Korgakubo Kokubunji-shi, Tokyo, Japan; Ryo Nagase, 2-6-1-204, Higashihara Mito-shi, Ibaraki-ken, Japan

[21] Appl. No.: 578,911

[22] Filed: Sep. 6, 1990

[51] Int. Cl.$^5$ .......................... G02B 6/36; G02B 7/26
[52] U.S. Cl. ........................................ 385/81; 385/86
[58] Field of Search ................. 350/96.2, 96.21, 96.22

[56] References Cited

U.S. PATENT DOCUMENTS

| | | | |
|---|---|---|---|
| 4,834,487 | 5/1989 | Abendschein et al. | 350/96.2 |
| 4,863,235 | 9/1989 | Anderson et al. | 350/96.2 |
| 4,961,624 | 10/1990 | Savitsky et al. | 350/96.2 |
| 4,968,109 | 11/1990 | Tanaka | 350/96.2 |
| 4,974,924 | 12/1990 | Okada | 350/96.2 |
| 4,988,160 | 1/1991 | Luettgert et al. | 350/96.2 |

*Primary Examiner*—William L. Sikes
*Assistant Examiner*—Robert E. Wise
*Attorney, Agent, or Firm*—Elroy Strickland

[57] ABSTRACT

Means and method for assembling an optical fiber cable with a tubular member that secures an outside protective jacket of the cable. The inside wall of the tubular member is provided with serrations such that when the wall is physically reduced on the protective jacket, the serrations engage and retain the jacket without compressing the inner optical fiber so that it is free to move longitudinally within the jacket. This is accomplished by using a crimping device having a crimping aperture that is sized to precisely control the amount of reduction of the tube wall onto the protective jacket.

5 Claims, 1 Drawing Sheet

CABLE JACKET RESTRAINT IN OPTICAL FIBER CONNECTORS

BACKGROUND OF THE INVENTION

The present invention relates generally to connectors for optical fibers, and particularly to a connector that secures an outer insulating jacket located on an inner optical fiber in the connector to insure protection of the inner fiber during handling and use of the connector.

Optical fiber cables generally comprise a center optical fiber, the diameter of which may be on the order of 125 microns which size includes a thin cladding of material having an index of refraction different from that of an inner, light conducting core of the fiber. The optical fiber is also coated with one or more thermoplastic materials to a diameter of typically 900 microns. Such a fiber is surrounded by an aramid yarn, which serves as a strain relief member to protect the optical fiber (generally rather fragile) from breaking. Over the aramid yarn is disposed an insulating jacket, of PVC material, for example, the jacket being necessary to portect the optical fiber against damage from sources outside of the cable, as well as to protect the fiber by increasing the radii of any bends occurring during installation, removal or any other type of handling or use of the cable.

In providing the ends of fiber optic cables with means for connecting to another fiber optical cable or for connecting to light sensing devices, it is important that the ends of both the aramid yarn and the outer jacket be secured within the body of the connecting means. Certain jacket materials shrink due to changes in temperature, such that if left unattached, the jacket separates from the connector body and thereby exposes the yarn and fiber. Plenum grade materials, i.e., jacket materials that may be subject to smoke and fire in the "plenum space" above suspended ceilings, are particularly subject to shrinkage at room temperature.

It is known to secure the aramid fibers in a connector structure to maintain the necessary strain relief protection for the optical fiber. Patent art showing such retention includes U.S. Pat. No. 4,863,325 to Anderson et al., U.S. Pat. No. 4,790,622 to Levinson et al., U.S. Pat. No. 4,812,009 to Carlisle et al., and U.S. Pat. No. 4,804,252 to Beltzer et al. In the Carlisle et al. reference, FIG. 3 shows a yarn 33 secured between an outer, crimped sleeve 65 and an extension 55 of a barrel member 43. In Beltzer et al., a yarn 30 of optical fiber cable 26 is folded back over sleeve 42 and a second sleeve 46 disposed over the folded yarn. Sleeve 42 has a knurled surface 44. Sleeve 46 is crimped over the yarn and knurled surface of sleeve 42.

What has been essentially neglected in the art has been the need to secure the outer insulating jacket in the connector body so that the inner optical fiber is and remains protected during use. The securing of the jacket, however, must not compress and restrain the optical fiber in the jacket, and should allow the coated fiber to move freely within the jacket, within the yarn and within the connector body. In the case of the above Carlisle et al. patent, for example, outer sleeve 65 is crimped on the end of the jacket in a manner that tends to compress and restrain inner fiber 26 so that the fiber is not free to move longitudinally within the jacket and connector body.

In the above Beltzer et al. patent, the yarn is crimped between the knurled surface 44 of inner sleeve 42 and outer sleeve 46. An end of outer jacket 32 of cable 26 is located within the inner ferrule, but is not secured therein by crimping, as the inner ferrule is a non-compressible member.

SUMMARY OF THE INVENTION

The present invention is directed to a crimping device that solves the problem of jacket separation from a connector body. The device has a compressible portion and barrel sized to receive the outer insulating jacket of a cable, with the inside surface of the barrel being provided with inwardly-directed serrations that engage and grip the jacket material when the device is crimped on the jacket in a controlled manner. The serrations hold the jacket within the barrel, and the controlled amount of crimp is not sufficient to compress the inner optical fiber or in any manner restrain substantially its longitudinal freedom within the jacket and connector. In this manner, with handling and/or bending of the cable, the optical fiber is free to move longitudinally within the jacket and crimp ring while the jacket is and remains secured in the crimp ring by the serrations of the crimping.

BRIEF DESCRIPTION OF THE DRAWINGS

The objectives and advantages of the invention will be best understood from consideration of the following detailed description and the accompanying drawings in which.

PREFERRED EMBODIMENTS OF THE INVENTION

Figure 1:
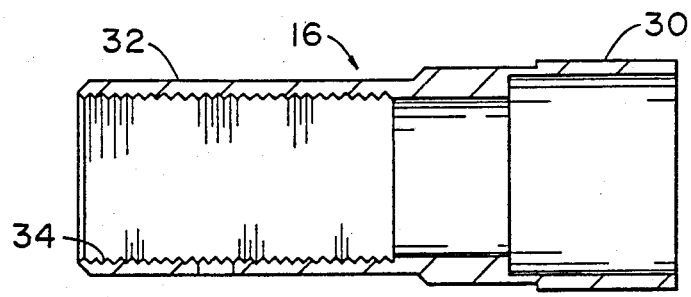
FIG. 1 is a view of the crimp ring of the invention shown in longitudinal section.
Figure 2:
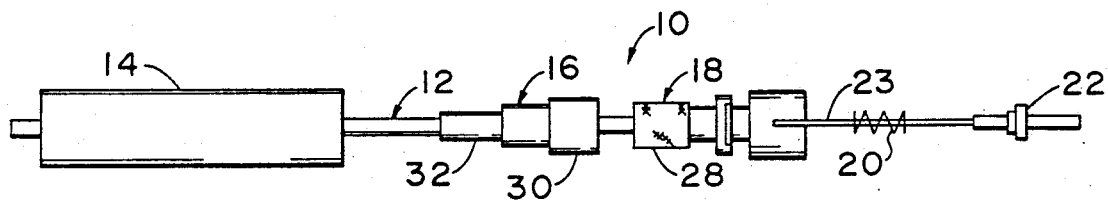
FIG. 2 is a side elevation view of the crimp ring of FIG. 1 shown/ disposed on an optical fiber cable in combination with certain, other components of a connector assembly.

Referring now to FIG. 2 of the drawings, an assembly 10 is shown diagrammatically in which a fiber optical cable 12 is located in (i.e., threaded through) a heat shrinkable tube 14, a novel crimp ring (tubular member) 16 (FIG. 1), a second ring (and tubular member) 18, a coil spring 20 and a terminating ferrule member 22 that receives the end of an optical fiber 23. "Rings" 16 and 18 are small tubular members appropriately sized to receive cable 12. Hence, they are shown somewhat enlarged in the figures, for better viewing, except that member 16 in FIG. 1 is greatly enlarged to show certain inside features discussed below.

The end of optical fiber 23 is secured in ferrule member 22 by an adhesive material, for example. The terminating member is adapted to be located and secured in housing (not shown) for connecting the fiber end to a terminating connector assembly of another fiber optic cable or to sensor means for sensing electromagnetic (light) energy. Spring 20 is secured between the rear of member 22 and the forward end of ring 18 when the above components are fully assembled. Spring 20 maintains member 22 in a forward position to insure contact with the ferrule member of another connector. Spring 20 also allows longitudinal movement of the optical fiber in the cable jacket and connector assembly.

Figure 3:
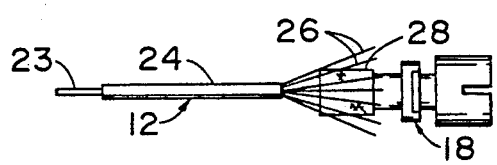
FIG. 3 shows the yarn of a fiber optic cable located about the knurl surface of member that cooperates with the crimp ring of FIG. 1 to secure the yarn.
Figure 4:
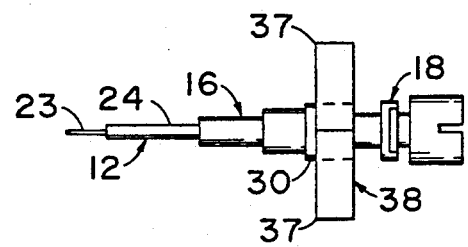
FIG. 4 is a diagrammatic side elevation view of a crimp ring of FIG. 1.
Figure 5:
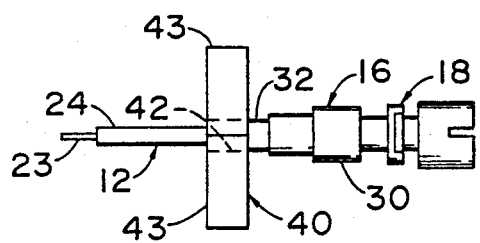
FIG. 5 shows in elevation and diagrammatically a crimping tool disposed about a second barrel portion of the crimp ring of FIG. 1 in the process of reducing the barrel portion on an insulating sleeve of an optical cable in a controlled manner.

In assembling the above components, the components are located on cable 12 in order shown in FIG. 2. One end of the optical fiber (not shown) is exposed to secure it in terminating ferrule 22. The cable includes an outer jacket 24 (FIGS. 3 to 5) and an aramid yarn 26 (FIG. 3) located in the jacket and around the optical fiber. The yarn is exposed by removing an end portion of the outer jacket. The yarn is then evenly trimmed (if uneven) and spread over a non-compressible knurled portion 28 of ring 18 located adjacent a barrel portion 30 of crimp ring 16. Barrel portion 30 is best seen in the sectional view of FIG. 1. The inside diameter and bore of the barrel is shown somewhat larger than the remainder of the crimp ring and is sized to fit over knurled portion 28 of ring 18 and over yarn 26 when the yarn is spread over the knurled portion, and the crimp and stop rings are brought together (FIGS. 4 and 5).

Referring again to FIG. 1 of the drawings and to the crimp ring 16 of the Figure, a somewhat elongated bore formed by a second barrel portion 32 of crimp ring 16 is located behind barrel 30 of the ring. The inside surface of barrel portion 32 is provided with serrations 34 or other types of projections or threads that extend generally circumferentially around the barrel and thus perpendicular to the axis of any cable inserted into the barrel.

With the yarn 26 disposed on and about knurled portion 28 of ring 18, crimp ring 16 is moved forward to a position that locates barrel 30 over knurled portion 28 and yarn 26. The barrel portion is next reduced in diameter (i.e., crimped) on the knurled portion and yarn to secure the yarn between 16 and 18 and to secure 16 on 18. This is accomplished by the jaws 37 of a crimping tool 38, shown only diagramatically in FIG. 4, being operated to effect the reduction of the diameter of barrel 30.

A second crimping tool 40 is next employed to reduce the serrations 34 of ferrule 16 into engagement with the protection jacket of cable 12. Barrel 32 of the ferrule is positioned in an opening 42 between the jaws 43 of tool 40 and the jaws are closed on the barrel. The size of opening 42 in relation to the uncrimped diameter of the barrel is such that reduction in the size of the wall of barrel 32 on the cable is controlled in a manner that does not compress the jacket and yarn of the cable on the optical fiber but does force serrations 34 into the jacket material. This permits the optical fiber to move axially and longitudinally within the yarn, jacket and crimp ring so that the fiber will not be subject to breaking when the cable is bent. Similarly, the jacket is secured in the crimp ring by serrations 34 to prevent exposure of the optical fiber. The secured yarn prevents undue strain on the fiber when the cable is pulled and/or bent.

After the above components of assembly 10 are assembled, tube 14 is moved forward to a position over crimp ring 16 and ring 18 and heated to shrink the tube over these components and a portion of the cable extending rearwardly of the crimp ring. Tube 14 serves to prevent acute bending of the cable and fiber at the rear edge of the crimp ring.

While the invention has been described in terms of preferred embodiments, the claims appended hereto are intended to encompass all embodiments which fall within the spirit of the invention.

What is claimed is:

1. A method of assembling together a tubular member and an optical fiber having an outer protective jacket, the method comprising:
    providing a tubular member having a wall portion provided with inwardly facing serrations,
    inserting the fiber and the jacket into said tubular member,
    reducing the cross section of said tubular member on said outer jacket such that the serrations engage and secure said jacket in said tubular member and in a manner that allows the optical fiber to move longitudinally within the jacket and tubular member.

2. A method of retaining an end of an outer protective jacket of an optical fiber within a tubular member, said optical fiber being disposed to move longitudinally within said jacket, the method comprising:
    providing a tubular member having a wall defining bore and provided with serrations on an inner surface of said wall,
    inserting the fiber jacket into said bore,
    reducing the cross section of said bore on said jacket such that the serrations of the wall engage and secure the jacket in the tubular member and in a manner that allows the optical fiber to move longitudinally within the jacket and tubular member.

3. A tubular member for securing the outer protective jacket provided on an optical fiber in said tubular member, said member including:
    a wall that defines a bore for receiving the protective jacket containing an optical fiber,
    inwardly directed serrations provided on an inner surface of said wall,
    with the wall of said tubular member being adapted to be physically reduced on said jacket to secure the jacket in the bore of said tubular member while allowing the optical fiber to move longitudinally within the jacket and tubular member.

4. The tubular member of claim 3 in which the wall thereof provides a second bore for receiving a knurled surface of a second tubular member.

5. The means of claim 4 in which the second tubular member has yarn material of said fiber optic cable disposed over the knurled surface of the second tubular member,
    said knurled surface and yarn material being disposed and secure din an end portion of the tubular member adapted to secure the protective jacket.

* * * * *

UNITED STATES PATENT AND TRADEMARK OFFICE
CERTIFICATE OF CORRECTION

PATENT NO. : 5,073,043

DATED : December 17, 1991

INVENTOR(S) : Brian A. DiMarco, et al

It is certified that error appears in the above-identified patent and that said Letters Patent is hereby corrected as shown below:

ON THE TITLE PAGE:    Item [76]

change "Brain" to --Brian--.

Column 4, line 58;

Change "secure din" to --secured in--.

Signed and Sealed this

Thirteenth Day of April, 1993

*Attest:*

STEPHEN G. KUNIN

*Attesting Officer*    *Acting Commissioner of Patents and Trademarks*